United States Patent [19]
Stetson

[11] Patent Number: 5,257,089
[45] Date of Patent: Oct. 26, 1993

[54] OPTICAL HEAD FOR SHEAROGRAPHY

[75] Inventor: Karl A. Stetson, Coventry, Conn.

[73] Assignee: United Technologies Corporation, Hartford, Conn.

[21] Appl. No.: 898,590

[22] Filed: Jun. 15, 1992

[51] Int. Cl.⁵ ............................................. G01B 9/02
[52] U.S. Cl. ................................ 356/353; 356/35.5; 356/345; 73/800
[58] Field of Search ............... 356/345, 357, 353, 358, 356/355; 73/800, 815

[56] References Cited

U.S. PATENT DOCUMENTS

| | | | |
|---|---|---|---|
| 3,816,649 | 6/1974 | Butters et al. | 178/6.8 |
| 4,887,899 | 12/1989 | Hung | 356/35.5 |
| 5,094,528 | 3/1992 | Tyson, II et al. | 356/35.5 |

OTHER PUBLICATIONS

Y. Y. Hung et al., "Measurement of Slopes of Structural Deflections by Speckle-shearing Interferometry", *Experimental Mechanics*, Jul. 1984, pp. 281-285.

J. S. Leendertz et al., "An Image-Shearing speckle-pattern interferometer for measuring bending moments", *Journal of Physics E: Scientific Instruments*, vol. 6, 1973, pp. 1107-1110.

Primary Examiner—Samuel A. Turner
Assistant Examiner—Robert Kim
Attorney, Agent, or Firm—Gerald L. DePardo

[57] ABSTRACT

An optical head for a shearography system includes any standard TV camera lens 56, such as a wide-angle lens, which views a region of a test object 50 that is illuminated by coherent light 52. The lens 56 creates an image at an image plane where a field lens 80 is located. The field lens 80 redirects the light so as to allow substantially all the light of the image to pass through a first relay lens 86, thereby projecting the image with uniform brightness, i.e, no vignetting. The lens 86 provides collimated light 88,90 to a shearing element, such as a Michelson interferometer, comprising a beamsplitter 92 and two mirrors 94,96. Use of collimated light minimizes aberrations typically caused by beamsplitters. Collimated output light 102,104 from the shearing element is refocused onto a TV camera sensor plate 112 where the sheared interfered image is electronically detected for processing and viewing. The invention allows the shearing element to be sized independent of the size of the region on the object 50 to be imaged.

9 Claims, 3 Drawing Sheets

OPTICAL HEAD FOR SHEAROGRAPHY

TECHNICAL FIELD

The present invention relates to shearography and, more particularly, to an improved design for an optical head used in electronic shearography.

BACKGROUND ART

It is known in the art that "shearography" (also known as, image-shearing, speckle-pattern interferometry or speckle-shearing interferometry) consists of interfering an image of an object illuminated by laser light with itself after a small amount of lateral displacement (or shear) has been introduced thereto. Shearography is a technique for measuring phase changes between two optical fields having random amplitude and phase distributions obtained when a surface is illuminated with laser light and imaged by a camera through a shearing mechanism, as described in the article: J. A. Leendertz et al, "An Image Shearing Speckle Pattern Interferometer for Measuring Bending Moments", *J. Phys. E. Sci. Inst.*, Vol.6 (1973), pp 1107–1110, and the article: Y. Y. Hung et al, "Measurement of Slopes of Structural Deflections by Speckle Shearing Interferometry", *Exp. Mech.*, Vol.14 (1974), pp 281–285.

Typically, the image is sheared, as is known, so that the speckle pattern from one point on the surface of the object can be made to interfere with the speckle pattern from a neighboring point. The resultant interference pattern is recorded and used as a reference. The pattern is random and depends on the characteristics of the surface of the object under study.

A second interference pattern is obtained when the object is stressed or deformed by temperature, pressure, or other means. The first (reference) interference pattern is made to interfere with the second (stressed) interference pattern by a known means called correlation interferometry. Both interference patterns comprise random speckles, but at regions where the phase of the interfering fields in the second pattern differ by an integral number of wavelengths from the first pattern, the speckles in the second pattern will correlate with the speckles of the first. Similarly, between these regions, the speckles are not correlated (decorrelated).

Interfering the two interference patterns produces, in general, cyclical alternations of correlation and decorrelation across the image of the object. When these alternations are made visible, the resultant image is a "fringe pattern" (i.e., regular alternation of lightness and darkness) that may be used to measure the deformation of the object.

It is also known in the art to use double exposure photography combined with Fourier transform plane filtering in order to make the resultant fringe pattern visible to the observer. Further, it is known that video frame storage and real time video subtraction provides an advantageous method of generating speckle correlation fringes. Anywhere two speckle patterns are correlated, the subtracted image comprises black pixels. Conversely, where the patterns are decorrelated, the subtracted image comprises a high percentage of white pixels. This is known in the art and is described in U.S. Pat. No. 3,816,649 to Butters et al.

A number of optical configurations have been proposed for providing the sheared images for shearographic analysis. The apparatus described the aforementioned article by Leendertz et al is essentially a Michelson interferometer, i.e., a partially reflecting beamsplitter and two mirrors substantially perpendicular to each other with one mirror slightly tilted relative to the other. The output of the beamsplitter provides two images having the same orientation, yet shifted laterally with respect to one another. Speckle pattern interferometry is then used to measure phase changes between the two images resulting from deformation of the surface.

Another apparatus comprises a lens with two apertures and a pair of glass blocks used to divert the rays passing through the lens apertures, as described in the aforementioned article by Hung et al. A third configuration includes a birefringent material (such as a calcite crystal) to provide the shearing effect, followed by a single lens which is followed by a polarizer, as described in U.S. Pat. No. 4,887,899 to Y. Hung. A fourth configuration includes a beamsplitter in combination with a single mirror as described in U.S. Pat. No. 5,094,528 to Tyson II, et al.

Each of the aforementioned configurations have an imaging lens (such as a TV camera lens), that forms the image on an image sensing device, located at the output of the shearing element (i.e., the optical element(s) used to provide the sheared image).

This arrangement has an inherent disadvantage in that the shearing element must be sized to allow viewing of the region on the object to be imaged. Therefore, the size of the shearing element must be significantly larger than the entrance pupil of the TV camera lens to image a large area of the object. Consequently, the size of the shearing element determines the angular field of view of the imaging lens, thereby making wide-angle viewing of the object, size prohibitive.

DISCLOSURE OF INVENTION

Objects of the present invention include provision of an optical shearography head which directs an image through an image-sharing element in such a way that any conventional imaging lens, including a zoom lens or a wide-angle lens, may be used, which allows the size of the image shearing element to be independent of the field of view, and which eliminates aberrations commonly resulting from imaging through a beamsplitter.

According to the present invention, a primary imaging lens, such as a TV camera lens, has an exit aperture and forms an image of an object being illuminated by coherent light, at an image plane. A field lens is located approximately at the image plane (of the primary imaging lens) with a focal length approximately equal to the distance to the exit aperture of the imaging lens. The field lens redirects the light from the primary imaging lens to a first relay lens, thereby allowing substantially all the light from the image to pass through the first relay lens. The first relay lens is designed to collimate the light from the image formed by the TV camera lens. The collimated light from the first relay lens is incident upon a shearing element, such as a Michelson interferometer, thereby providing output light having minimal aberrations. The output light from the shearing element passes through a second relay lens which refocuses the image on an image sensing device, such as a TV camera sensor plate.

The invention represents a significant improvement over previous optical shearography configurations, because any standard TV camera lens, including a zoom lens or a wide-angle lens, can be used with the device without changing any other optical element in the system. Consequently, the size of the shearing element remains the same for any size region on the object to be imaged. Also, the light beams corresponding to each point in the image are collimated as they pass through the beamsplitter; thus, the beamsplitter does not aberrate them. Furthermore, employing the field lens also ensures that all the desired regions of the object are imaged with maximum brightness and suffer no vignetting.

The foregoing and other objects, features and advantages of the present invention will become more apparent in light of the following detailed description of exemplary embodiments thereof as illustrated in the accompanying drawings.

BEST MODE FOR CARRYING OUT THE INVENTION

Figure 1:
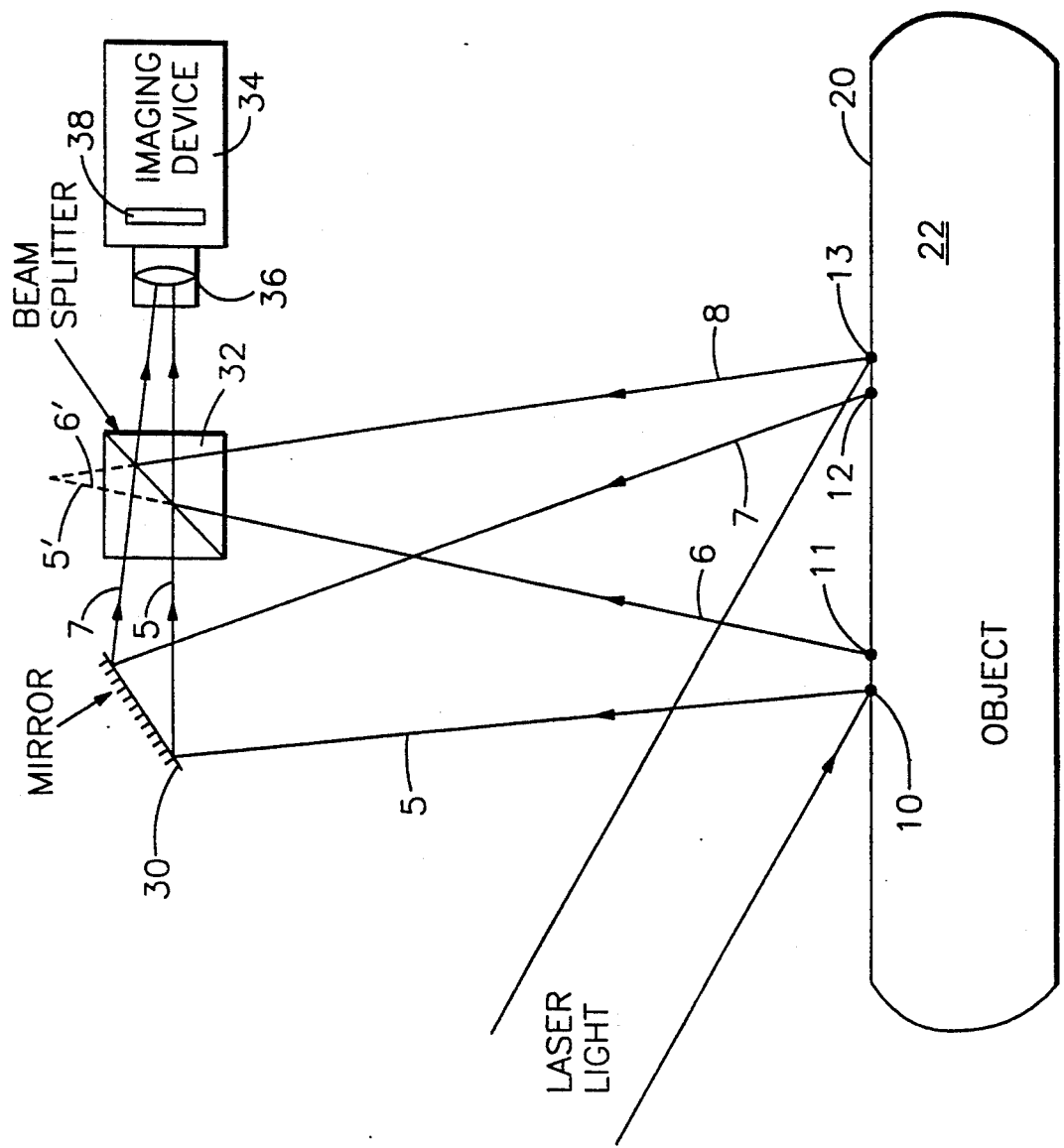
FIG. 1 is a ray diagram of a prior art shearography device having a TV camera located at the output of an image shearing element.

Referring to FIG. 1, a prior art shearography device similar to that described in the aforementioned U.S. Pat. No. 5,094,528 to Tyson II et al, receives reflected rays 5,6,7,8 from points 10,11,12,13, respectively, on a surface 20 of an object 22. The reflected ray 5 strikes a mirror 30, is reflected thereby, and is directed toward a beamsplitter 32. One portion of the ray 5 reflected from the mirror 30 is transmitted through the beamsplitter 32 toward a detector 34. The remainder ray 5' is reflected upwardly by the beamsplitter 32 and is indicated as a dotted line.

The reflected ray 6 from the point 11 on the surface 20 strikes the beamsplitter 32 at the same point that the ray 5 strikes the beamsplitter 32. One portion of ray 6 is reflected by the beamsplitter 32 toward the detector 34 and the remainder ray 6' is transmitted upwardly through the beamsplitter 32, also indicated by a dotted line. The rays illustrated by the dotted lines 5' and 6' are not of concern. The portion of the ray 6 that is reflected by the beamsplitter 32 coincides with the path of the ray 5 toward the detector 34. Thus, a portion of the rays 5,6 are directed onto the same path toward the detector 34. A similar pattern of reflection and refraction occurs for the beams 7,8. Thus, the beamsplitter 32 and the mirror 30 together make up the shearing element for the aforementioned shearography device of Tyson II et al.

The detector 34 includes a TV camera lens 36 and a photosensitive screen 38. The sheared image from the beamsplitter 32 is focused onto the screen 38 by the lens 36. Thus, the TV camera lens 36 views the sheared image at the output of the beamsplitter/mirror combination (i.e., the shearing element). Consequently, the distance between the mirror 30 and the beamsplitter 32, i.e., the size of the shearing element, is dependant upon the size of the region 40 on the object 22 to be imaged.

Figure 2:
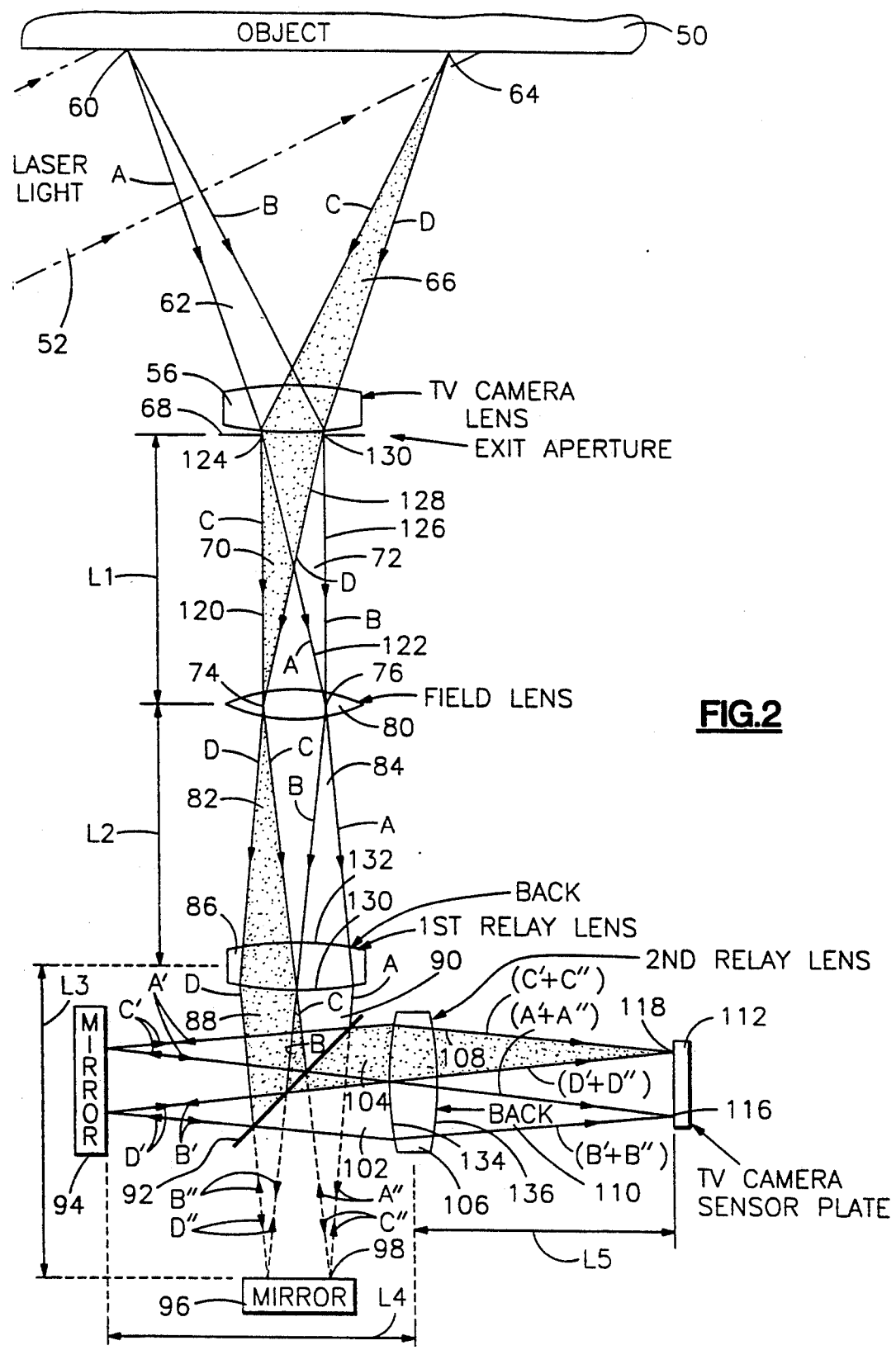
FIG. 2 is a ray diagram of a TV camera lens viewing incident light directly from an illuminated object, and of all the lenses and paths of light rays for an unsheared output image, in accordance with the present invention.

Referring now to FIG. 2, a primary imaging lens 56, such as a TV camera lens, receives light from an object 50 illuminated by laser light 52. A first point 60 on the object 50 emits a divergent cone (beam) of light 62 having boundaries defined by rays A,B as the extreme rays of the beam 62 incident on the TV camera lens 56. Similarly, a second point 64 on the object 50 emits a divergent beam of light 66 having the rays C,D as extreme rays of the beam 66 incident on the TV camera lens 56. For ease of viewing, the beam bounded by the rays C,D are drawn dotted. As can be seen from FIG. 2, a wide-angle viewing lens may be used to image a large region of the object 50.

The TV camera lens 56 contains an exit aperture 68 which is shown external to the lens 56 for clarity, but in reality is located within the lens 56. The camera lens 56 may be a standard TV camera lens with an effective focal length (for determining image amplification) of approximately 25 mm and a back focal length of approximately 17 mm. The distance from the exit aperture 68 to the plane where the lens 56 produces an image is hereinafter called the image plane distance. For the aforementioned values of the effective and back focal lengths, the image plane distance is approximately 30 mm. However, any standard imaging lens will work equally well, e.g., a lens having an adjustable effective focal length that varies from 12.5 to 75 mm. The lens could even be a microscope lens, if desired.

The camera lens 56 converts the divergent beams 62,66 to focused beams 72,70, respectively, to form an image of the object 50 a distance L1 from the exit aperture 68. Light coming from the region of the object being imaged can be defined by a plurality of such beams 62,66.

The two points 60,64 on the object 50 are imaged at points 74,76, a distance L1, e.g., approximately 30 mm, from the exit aperture 68. The distance L1 is equal to the image plane distance of the TV camera lens 56. Other image plane distances may be used for the camera lens 56, if desired.

A field lens 80, e.g., a coated Positive Spherical lens, Melles Griot Part No. 01LPX123/078, is located a distance L1 from the exit aperture 68, approximately at the image plane of the TV camera lens 56, and has a focal length approximately equal to the distance L1 to the exit aperture 68. The field lens 80 provides divergent beams 82,84, corresponding to light from the points 64,60, respectively, which are redirected from divergent beams that would exist if the field lens 80 was not there.

A first relay lens 86, such as a doublet lens, is placed a distance L2, e.g., approximately 45 mm, from the field lens 80 and receives the divergent beams 82,84. The first relay lens 86 provides two collimated beams 88,90 corresponding to the divergent beams 82,84, respectively. A doublet lens, as is known, has a front and a back focal plane and comprises two lens elements cemented together, one having a low index of refraction and the other having a high index of refraction. As is known, the front focal plane is the plane (located a known distance from the front of the lens; hereinafter called the front focal plane distance) at which parallel rays of light entering the back of the lens come to focus, and the back focal plane is the plane (located a known distance from the back of the lens; hereinafter called the back focal plane distance) at which parallel rays entering the front of the lens come to focus.

The doublet lens 86 of the invention was custom designed to minimize aberrations such as: coma, spherical aberration, astigmatism, image distortion, and field curvature, with a front focal plane aperture. However, any compound lens or optical device having the properties discussed herein may be used.

The collimated beams 88,90 are incident on an optical interferometer, such as a Michelson interferometer (i.e., the shearing element, or shearing means) which comprises a beamsplitter 92, a first mirror 94, and a second mirror 96. The beams 88,90 are incident upon the beamsplitter 92 whereby they are each split into two collimated beams and then recombined after each split beam is reflected off of a respective mirror. Although the beamsplitter 92 is shown as a straight line, it is actually a 1 inch cube, e.g., a crown glass BK 7 cube beamsplitter, Rocky Mountain Industries Part No. BC-25VS-K. However, other beamsplitters may be used if desired.

More specifically, the beam 90, which is bounded by the rays A,B is split into two collimated beams, one defined by the rays A″,B″ and another bounded by the rays A′,B′. Similarly, the beam 88 (bounded by the rays C,D) is split into two collimated beams, one beam bounded by the rays C″,D″ and the other beam bounded by the rays C′,D′. The split beams defined by the rays A″,B″ and C″,D″ each strike the mirror 96 and are reflected back to the beamsplitter 92 along the path of the other beam. For example, the ray A″ strikes the mirror 96 at a point 98 and is reflected upwardly along the same path as the C″ ray is propagating downwardly. Similarly, the split beams defined by the rays A′,B′ and the rays C′,D′, strike the mirror 94 and are reflected back to the beamsplitter 92 along the path of the opposite travelling split beam.

The split beams return to the beamsplitter 92 where they are recombined with the beams they were split from. For example, the ray A′ is recombined with the ray A″ and the ray B′ is recombined with the ray B″. The recombined set of rays form a collimated output beam 102 bounded by the rays (A′+A″), (B′+B″). Similarly, the rays C′,C″ are recombined and the rays D′,D″, respectively, to form a collimated output beam 104 bounded by the rays (C′+C″), (D′+D″).

Figure 3:
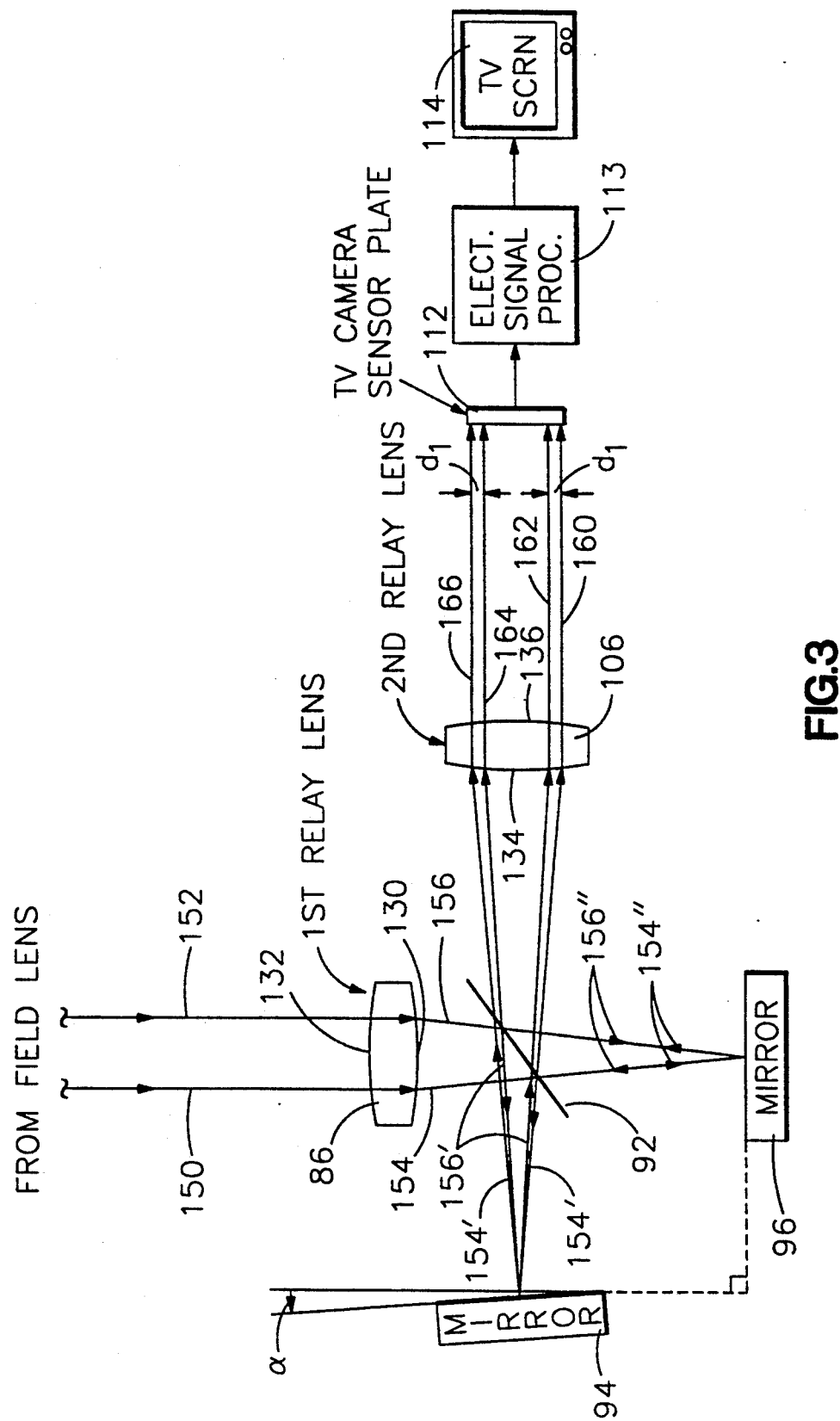
FIG. 3 is a ray diagram showing the central rays of the beams shown in FIG. 2 and showing the effect of laterally sheared images on an image sensor plate, in accordance with the present invention.

The collimated output beams 102,104 from the beamsplitter 92 are provided to a second relay lens 106, e.g., a doublet lens having similar characteristics to the first relay lens 86. The second relay lens 106 provides a focused beam 108 bounded by the rays (C′+C″) and (D′+D″) related to the input beam 88 to the beamsplitter 92 and a focused beam 110 bordered by the rays (A′+A″) and (B′+B″) related to the input beam 90 to the beamsplitter 92. The beams 108,110 are focused at a distance L5, e.g., 45 mm, from the lens 106, equal to the back focal plane distance (discussed hereinbefore) of the lens 106, on a TV camera sensor plate 112. The TV camera sensor plate 112 electronically detects the sheared interfered image, as is known, and provides signals to an electronic signal processor 113 (FIG. 3) which processes the image for display on a TV screen 114 (FIG. 3).

Thus, the point 60 from the object 50 is imaged onto a point 116 on the TV camera sensor plate 112. Similarly, the point 64 on the object 50 is imaged onto a point 118 on the sensor plate 112. On average, the distance L2 should equal the distance L5 within, approximately plus or minus 10%. Instead of electronically processing the image using the sensor plate 112, the invention will work equally well with other image processing devices, such as double exposure photography discussed hereinbefore; however, electronic processing has numerous shearographic analysis advantages (as discussed hereinbefore).

Similar to the doublet lens 86, the doublet lens 106 of the invention was custom designed to minimize aberrations such as: coma, spherical aberration, astigmatism, image distortion, and field curvature, with a front focal plane aperture. However, any compound lens or optical device having the properties discussed herein may be used.

Rays that intersect at the plane of the exit aperture 68 of the TV camera lens 56 can be thought of as defining divergent cones (beams) of light coming from points in that plane. One of such beams is defined by rays 120,122 which maps the point 124 at the exit aperture 68 onto points across the field lens 80 ranging from the point 74 to the point 76. Similarly, rays 126,128 define a divergent beam coming from the point 130 and being mapped to the same points 74,76 on the field lens 80. The field lens 80 can be thought of as converting these divergent beams into collimated beams defined by the rays B,D and the rays A,C, which are brought to focus on the mirror 96 by the first relay lens 86. The result is to form the image at the exit aperture 68 on the planes of the two mirrors 94,96. This arrangement ensures that all rays pass through the beamsplitter 92 and lenses 86,106, thereby projecting the image from the image plane of the TV camera lens 56 with uniform brightness; thus, no vignetting occurs.

To provide a frame of reference for describing the front and back focal planes of the relay lenses 86,106, the first relay lens 86 is defined as having a front surface 130 and a back surface 132. Similarly, the second relay lens 106 has a front surface 134 and a back surface 136.

The first relay lens 86 is located a distance L3, e.g., 67.5 mm, from the mirror 96. The distance L3 comprises the front focal plane distance of the lens 86 (45 mm), plus 12.5 mm to compensate for the effect of the 1″ glass block of the beamsplitter 92. Similarly, the second relay lens 106 is located a distance of L4, e.g., 67.5 mm, from the mirror 94. The distance L4 comprises the front focal plane distance of the lens 106 (45 mm), plus 12.5 mm to compensate for the effect of the 1″ glass block of the beamsplitter 92. The distance L3 should be substantially equal to the distance L4 and can be achieved by calibrating or adjusting the Michelson interferometer configuration (i.e., adjusting the distances between the mirrors 94,96 and the beamsplitter 92).

It should be understood that the distances L2,L3,L4,L5 given hereinbefore are merely exemplary values and other distances may be used provided they are determined as follows. The distance L2 is set such that the image (from the TV camera lens 56) is located substantially at the back focal plane of the first relay lens 86 (i.e., such that substantially all the divergent beams coming from points in the image at the field lens are collimated at the output of the first relay lens 86); the distance L3 is set such that the mirror 96 is substantially at the front focal plane of the first relay lens 86; the distance L4 is set such that the mirror 94 is substantially at the front focal plane of the second relay lens 106; the distance L5 is set such that the image is substantially at the back focal plane of the second relay lens 106.

In practice, the distance L1 is set based on the TV camera lens 56 as discussed hereinbefore, the distances L3 and L4 must be substantially equal as discussed hereinbefore, and the distance L5 may be fixed or only slightly variable (depending on the hardware configuration used). Thus, the distance L2 is used as the calibrating distance and is adjusted while viewing the image on the TV screen 114 (FIG. 3) until the image is clearly focused. This calibration technique was used merely for convenience and other techniques for calibrating the system may be used if desired.

It is known in the art that a beamsplitter will cause aberrations if either converging or diverging beams are passed therethrough. By providing the collimated beams 88,90 to the input of the beamsplitter 92, aberrations are minimized. Consequently, the invention provides an image on the TV camera sensor plate 112 which has minimal aberrations, thereby providing two clearly focused images superimposed on each other.

In FIG. 2, the mirrors 94,96 are shown to be exactly perpendicular to each other. However, in shearography, the goal is to superimpose two images which are laterally shifted with respect to each other. Thus, in an actual shearography application, either the mirror 94 or the mirror 96 will be canted slightly to provide the image shear required, as shown in FIG. 3. Because the light is coherent, the sheared images will interfere with each other as discussed hereinbefore, to provide the desired interference patterns.

Referring now to FIG. 3, to illustrate the shearing effect of the Michelson interferometer and the operation of the relay lenses 86,106, the central rays 150,152 of the beams 82,84 (FIG. 2), respectively, from the field lens 80 enter the first relay lens 86 essentially parallel. The first relay lens 86 provides the central rays 154,156 of the collimated beams 88,90 (FIG. 2), respectively, to the beamsplitter 92. The beamsplitter 92 splits the ray 156 into rays 156',156" and the ray 154 into rays 154',154", as discussed hereinbefore. Each split beam reflects off its respective mirror and returns to the beamsplitter where it is recombined, also as discussed hereinbefore. However, the beams returning to the beamsplitter from the mirror 94 do not return along the same path as the incident rays, because the mirror 94 is tilted by an angle α relative to the perpendicular plane of the mirror 96. Consequently, four central rays 160,162,164, 166 emerge from the beamsplitter 92 and the second relay lens 106 displaced by a lateral distance $d_1$ which relates to a displacement of certain number of pixels on the TV screen 114. For a small amount of shear, the displacement may be 1 to 5 pixels and for a large amount of shear, the displacement may be greater than 20 pixels.

Although the invention has been described as using a Michelson interferometer as the shearing element, it should be understood by those skilled in the art that other shearing elements may be used that accept collimated input light and provide collimated output light representing two laterally displaced interfered images. For example, a shearing element comprising a Wollaston prism, a liquid crystal phase plate (retarder), and a polarizer, will also work just as well. In that case, the relay lenses 86,106 would be aligned along the same axis, as apposed to being along perpendicular axes as shown in FIG. 2. Also, the relay lenses would be located at a distance such that the front focal planes are at the same plane, and the center of the Wollaston prism would be at the location where the two focal planes match-up.

Also, instead of using a 45 degree angle beamsplitter prism, it should be understood that beamsplitters with other angles may also be used. In that case, the location of the mirrors 94,96 would be different from that shown in FIG. 2, as is known in the art of optical interferometry.

Furthermore, even though the relay lenses 86,106 are unity magnification lenses, one or both may be non-unity magnifying lenses. If non-unity magnifying relay lenses are used, appropriate changes in the distances L2,L3,L4,L5 must be made, as is known in the optical art.

Still further, instead of using the field lens 80 to redirect the light from the TV camera lens 56, any optical device capable of receiving convergent beams and providing redirected divergent beams may be used if desired.

Although the invention has been described and illustrated with respect to the exemplary embodiments thereof, it should be understood by those skilled in the art that the foregoing and various other changes, omissions and additions may be made without departing from the spirit and scope of the invention.

I claim:

1. An optical head for performing shearography on a test object illuminated by coherent light, comprising:
   primary imaging means, capable of forming an input image of a predetermined region of the test object at an image plane located a predetermined primary image plane distance from said primary imaging means;
   redirecting means, disposed in the path of light emitted from said primary imaging means approximately at said primary image plane distance, for providing redirected divergent light;
   collimating means, disposed in the path of light emitted from said redirecting means, having a first front focal plane and a first back focal plane, for converting said redirected divergent light from said redirecting means to collimated input light;
   said redirecting means redirecting substantially all the light of said input image emitted from said primary imaging means through said collimating means, thereby allowing said collimating means to emit light related to said image at said primary image plane having uniform brightness;
   shearing means, located in the path of said collimated input light emitted from said collimating means, for providing collimated output light representing two laterally displaced interfered images related to said input image from said primary imaging means, said collimated output light having minimal aberrations, and said shearing means having a predetermined size;
   whereby said size of said shearing means is independent of the size of the predetermined region;
   focusing means, disposed in the path of said collimated output light emitted from said shearing means, having a second front focal plane and a second back focal plane, for converting said collimated output light from said shearing means to focused light; and
   image sensing means, disposed in the path of said focused light emitted from said focusing means substantially at said back focal plane of said focusing means, for detecting an output image represented by said focused light incident thereon.

2. The optical head of claim 1 wherein said shearing means comprises an optical interferometer.

3. The optical head of claim 1 wherein said shearing means comprises:

a beamsplitter disposed in the path of said collimated input light from said collimating means, for splitting said collimated input light from said collimating means into two split beams and for recombining said two split beams;

a first mirror disposed in the path of one of said two split beams substantially at said front focal plane of said collimating means, for reflecting said one of said two split beams back to said beamsplitter;

a second mirror disposed in the path of another of said two split beams substantially at said front focal plane of said focusing means for reflecting said another of said two split beams back to said beamsplitter; and said first mirror being tilted relative to a plane perpendicular to the plane defined by said second mirror.

4. The optical head of claim 1 wherein said primary imaging means comprises a TV camera lens.

5. The optical head of claim 1 wherein said primary imaging means comprises a wide-angle lens.

6. The optical head of claim 1 wherein said collimating means comprises a compound lens.

7. The optical head of claim 1 wherein said focusing means comprises a compound lens.

8. The optical head of claim 1 wherein said image sensing means comprises a TV camera sensor plate.

9. A method of performing shearography on a test object illuminated by coherent light, comprising the steps of:

forming an image of a predetermined region of the test object at a predetermined primary image plane distance;

redirecting light from said forming step, thereby providing redirected light;

collimating said redirected light from said redirecting step, thereby providing collimated light that represents substantially all the light of said image from said forming step;

shearing said collimated light from said collimating step by a predetermined amount, thereby providing a sheared image related to said image from said forming step having minimal abberations; and focusing said sheared image from said shearing step onto an image detector.

* * * * *

UNITED STATES PATENT AND TRADEMARK OFFICE
CERTIFICATE OF CORRECTION

PATENT NO. : 5,257,089

DATED : 26 October 1993

INVENTOR(S) : Karl A. Stetson

It is certified that error appears in the above-indentified patent and that said Letters Patent is hereby corrected as shown below:

In Column 8, line 26, after "located" insert --at--.

Signed and Sealed this

Thirty-first Day of May, 1994

Attest:

BRUCE LEHMAN

*Attesting Officer*  *Commissioner of Patents and Trademarks*